(12) United States Patent
Bannai

(10) Patent No.: US 6,587,226 B2
(45) Date of Patent: *Jul. 1, 2003

(54) DATA PROCESSING SYSTEM HAVING EXTERNAL TERMINAL AND DATA COMMUNICATION DEVICE CONNECTED TO THE SAME EXTERNAL TERMINAL, AND DATA PROCESSING METHOD IN THE SAME SYSTEM

(75) Inventor: Nobuyuki Bannai, Hasuda (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,655

(22) Filed: Oct. 14, 1998

(65) Prior Publication Data

US 2002/0041391 A1 Apr. 11, 2002

(30) Foreign Application Priority Data

Oct. 14, 1997 (JP) ................................. 9-296281
Oct. 13, 1998 (JP) ............................. 10-290556

(51) Int. Cl.$^7$ ................................................ H04N 1/00

(52) U.S. Cl. ....................................... 358/400; 358/468

(58) Field of Search ............................. 358/400, 468, 358/434, 435, 436, 407, 1.5, 1.15, 405

(56) References Cited

U.S. PATENT DOCUMENTS 5,966,375 A * 10/1999 Kagaya ...................... 370/388
5,974,559 A * 10/1999 Bannai ....................... 713/330
6,088,127 A * 7/2000 Pieterse ..................... 358/434
6,195,677 B1 * 2/2001 Utsumi ....................... 709/201

* cited by examiner

Primary Examiner—Jerome Grant, II
Assistant Examiner—Negussie Worku
(74) Attorney, Agent, or Firm—Fitzpatrick, Cella, Harper & Scinto

(57) ABSTRACT

A data communication device comprises a connection device for connection with an external terminal, a receiving device for receiving data, a decipher device for deciphering information sent from a companion when the receiving device receives data, a notifying device for notifying the external terminal through the connection device of predetermined information, and a selecting device for selecting information to be notified by the notifying device, according to a decipher result of the decipher device. A control method for controlling an information processing terminal connected to the data communication device, the control method comprises a reception step of receiving data received by the data communication device and information concerning a sender of the received data, from the data communication device, a determination step of determining a priority of the received data, based on the information concerning the sender, received in the reception step, and a control step of performing such control as to vary a method of notification of reception according to a determination result in the determination step.

10 Claims, 15 Drawing Sheets

FIG. 3
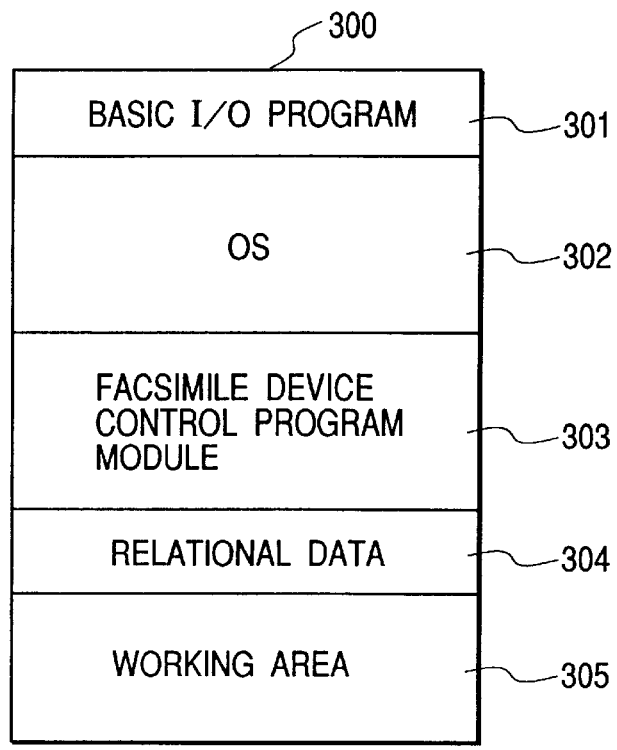
COMPANION DATA
FIG. 4
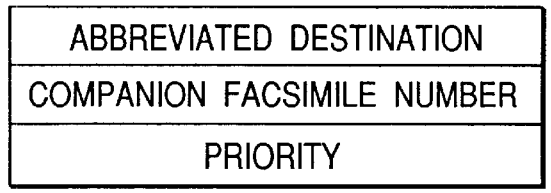
PRIORITY ID
FIG. 5
| ID | PRIORITY |
|----|----------|
| 0  | HIGH     |
| 1  | NORMAL   |
| 2  | LOW      |

PRIORITY DATA

| ID | PRIORITY | VALUE |
|---|---|---|
| #000* | HIGH | 0 |
| #111* | NORMAL | 1 |
| #222* | LOW | 2 |

FACSIMILE DEVICE SIDE

PC SIDE

FIG. 18

DATA PROCESSING SYSTEM HAVING EXTERNAL TERMINAL AND DATA COMMUNICATION DEVICE CONNECTED TO THE SAME EXTERNAL TERMINAL, AND DATA PROCESSING METHOD IN THE SAME SYSTEM

BACKGROUND OF THE INVENTION

1. Field of the Invention

The present invention relates to a data processing system having an external terminal, such as a personal computer (hereinafter referred to as PC), and a data communication device, such as a facsimile device, having an interface with the external terminal, and to a data processing method in the same system.

2. Related Background Art

It is conventionally known that in such a system, for example, when the facsimile device receives data through a telephone line, the facsimile device notifies the PC connected thereto through the interface of the reception of data.

The data received may be data to be checked by its recipient as soon as possible, data that does not have to be checked soon, or other data, and the conventional technology was susceptible to improvement in making the recipient properly handling the data received.

SUMMARY OF THE INVENTION

An object of the present invention is to provide a data communication device and a data processing method that overcome the above issue.

Another object of the present invention is to provide a data communication device and a data processing method that are so adapted that when the data communication device receives data with high urgency, it can make an operator of an external terminal properly handle the received data.

Still another object of the present invention is to provide a data communication device and a data processing method that permit an operator of an external terminal to readily select desired data out of plural data items received by the data communication device.

Still another object of the present invention is to provide a data communication device and a data processing method that permit easy execution of highly urgent communication with a specific companion.

The above objects and other objects of the present invention will become more apparent from the detailed description based on the drawings, which follows.

BRIEF DESCRIPTION OF THE DRAWINGS

FIG. 3 is a diagram to show an example of a memory map of data stored in a memory of the personal computer;

FIG. 4 is a diagram to show a specific example of companion data in the first embodiment of the present invention;

FIG. 5 is a diagram to show a specific example of priority IDs for determining priority in the first embodiment of the present invention;

FIG. 18 is a diagram to show an example of a display screen of the PC on the occasion of reception of a confidential facsimile in the third embodiment.

DESCRIPTION OF THE PREFERRED EMBODIMENTS

Figure 1:
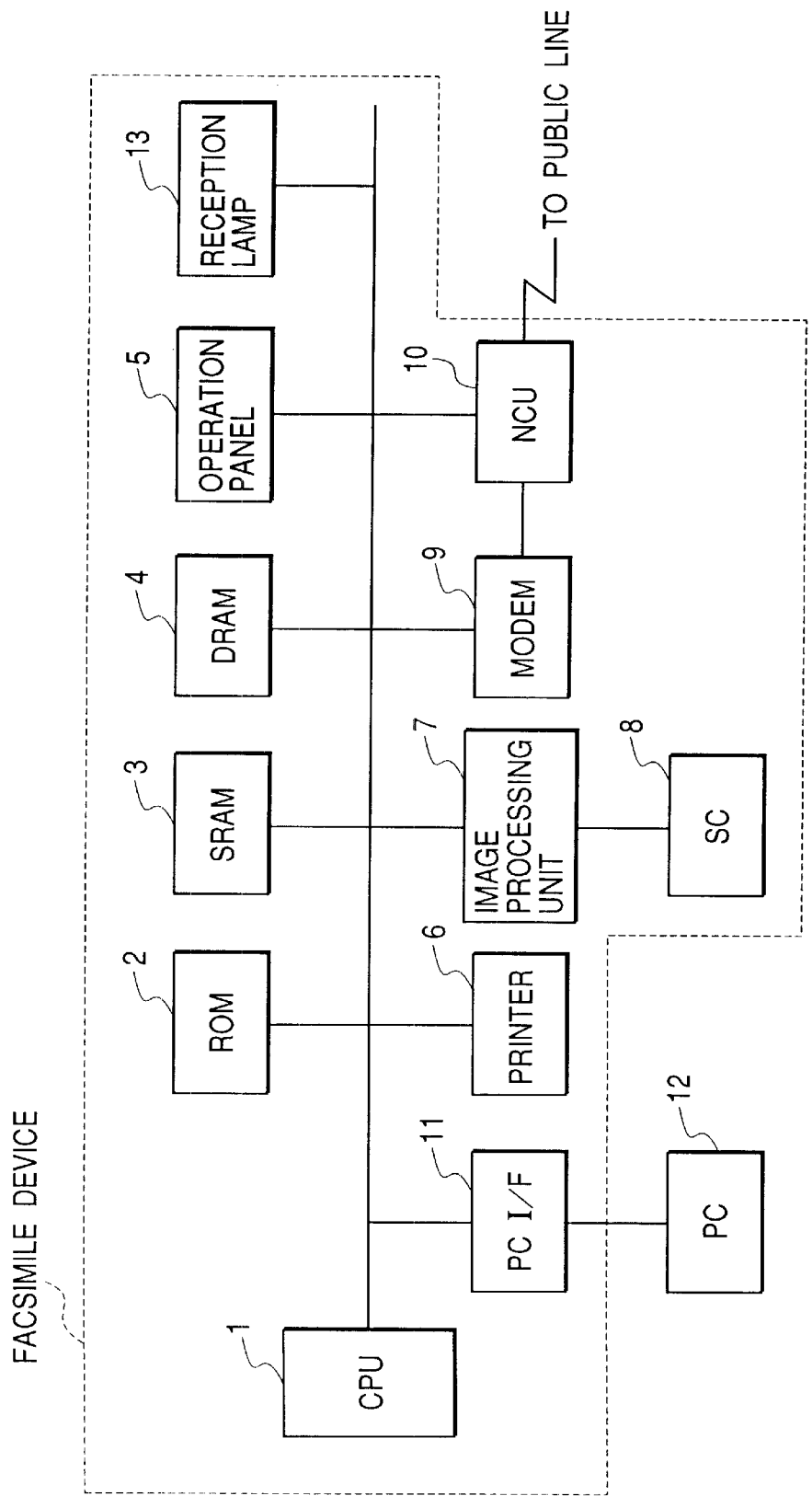
FIG. 1 is a block diagram to show the structure of a data processing system comprised of a facsimile device and a personal computer, which is an embodiment of the present invention.

FIG. 1 is a block diagram to show the structure of a data processing system comprised of a facsimile device and a personal computer (PC), which is an embodiment of the present invention. In the same figure the part enclosed in the dashed line represents the facsimile device.

CPU 1 is a system controlling part, which controls the whole of this facsimile device. ROM 2 is provided for storing a control program of this system. The CPU 1 executes various operations associated with the present embodiment, based on the control program stored in the ROM 2. The control program of CPU 1 does not always have to be only the one in the ROM 2, but the control program may also be one stored in an external storage medium such as a floppy disk or a CD-ROM, which is taken into RAM (for example, SRAM 3) in the device by a dedicated reading device and which is then decoded and executed by the CPU 1.

The SRAM 3 mainly stores management data and registered data of sent/received images, companion data, etc. and DRAM 4 mainly stores image data.

An operation panel 5 accepts various key operations etc. performed by the user. A printer 6 outputs a visual image based on image data input. An image processing unit 7 effects various image processing on the image data input. CS 8 is a contact type reading sensor for reading an image on an original. A modem 9 modulates and demodulates a digital signal and an analog signal.

NCU 10 performs control of public network. PC interface 11 is provided for exchange of data between the PC 12 and the present facsimile device. A reception lamp 13 is a lamp which is switched on on the occasion of memory reception where this facsimile device receives image data from the public network into its memory.

On the other hand, the PC 12 has the function as a general-purpose personal computer and is so adapted as to control the operation of the present facsimile device through the PC interface 11, to acquire image data received by the present facsimile device from the public network, and to display the substance of the image data on a display device.

The PC 12 has an address book for giving the designation of a destination for facsimile transmission of image data to the facsimile device, and name information, telephone number, presence or absence of priority, etc. of each destination can be written in this address book.

Figure 2:
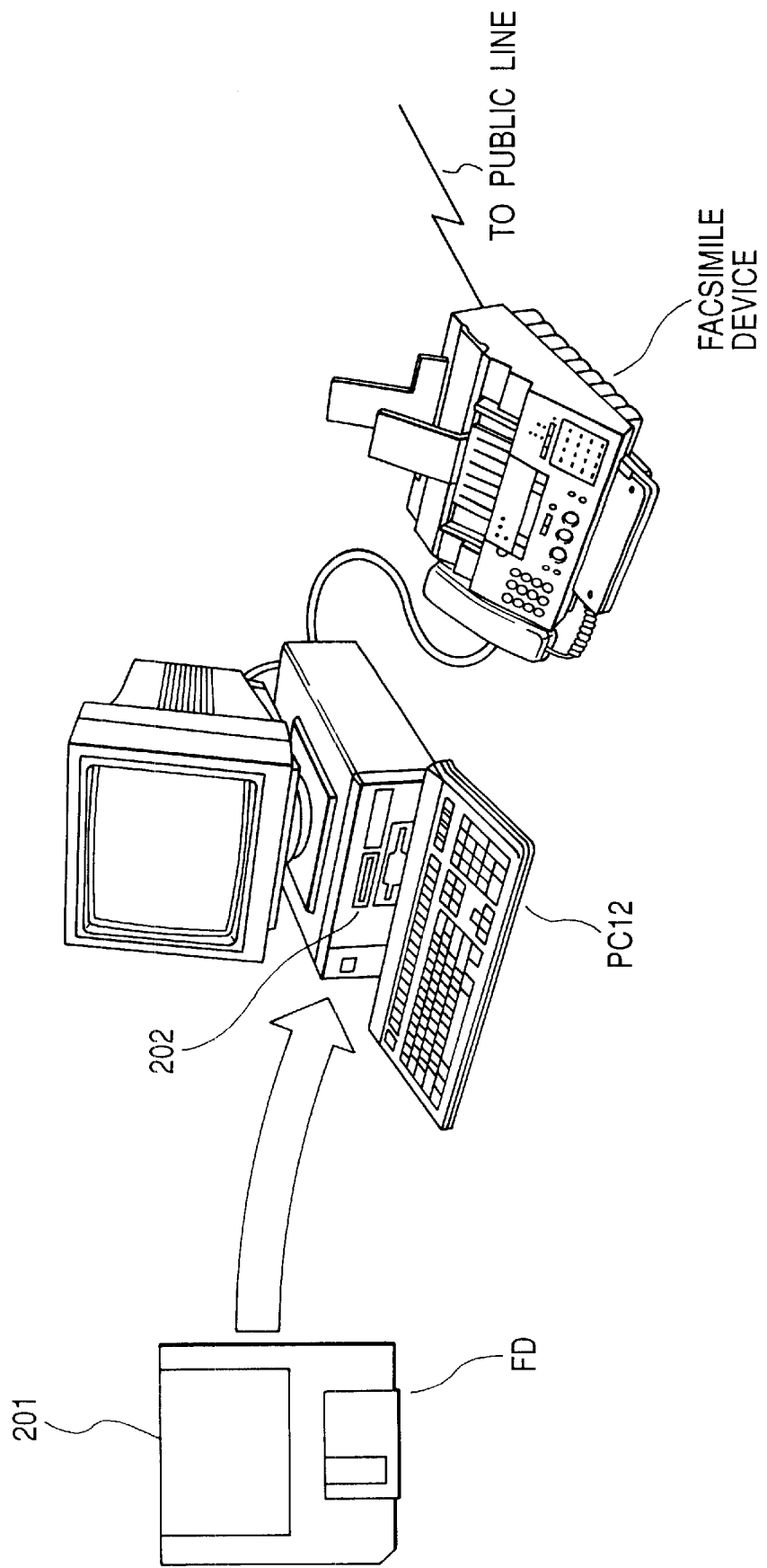
FIG. 2 is a perspective view to show a schematic view of the data processing system illustrated in FIG. 1.

FIG. 2 is a perspective view to show the appearance of the data processing system shown in FIG. 1.

As illustrated in this figure, the PC 12 is provided with a display device and a keyboard, and the PC 12 is adapted to display various information in the display device and to permit the operator to input various instructions through the keyboard. The PC 12 has an internal hard disk which stores code to indicate a program for controlling the facsimile device etc., as well as the address book. This program is installed in the hard disk by setting a floppy disk (FD) 201 into a floppy disk drive 202 and manipulating the keyboard.

The memory of the PC 12 stores the data as illustrated in FIG. 3.

Based on OS (operating system) 301 and basic I/O program 301, facsimile device control program module 303 and its relational data 304 are read into the RAM of PC 12 under control of the microprocessor of the PC 12 and then the program is executed.

Next, the operation of the first embodiment of the present invention will be described.

The first embodiment is so adapted that when the facsimile device receives image data via the public network, its priority is judged depending upon its sender and an indication for notification of reception is displayed on the screen of the display device of the PC 12 according to the priority.

FIG. 4 is an explanatory diagram to show a specific example of companion data in the first embodiment and FIG. 5 is an explanatory diagram to show a specific example of priority IDs for determining the priority in the first embodiment. In the first embodiment one-digit numerals of 0, 1, and 2 are used as priority IDs.

In the present embodiment, the companion data illustrated in FIG. 4 is stored on the SRAM 3 of the facsimile device, the facsimile device, receiving a facsimile, collates its sender companion with the companion data on the SRAM 3, the facsimile device determines the priority ID from the companion data if the sender companion is stored as companion data with priority, and the facsimile device notifies the PC 12 through the PC I/F 11 of an abbreviation of the companion, a facsimile number of the companion, and the priority ID.

In another configuration, the system may be so arranged that the companion data illustrated in FIG. 4 is set on the PC 12 side and the priority ID is determined on the PC 12 side from the abbreviation and facsimile number of the sender companion notified by the facsimile device.

Figure 6A:
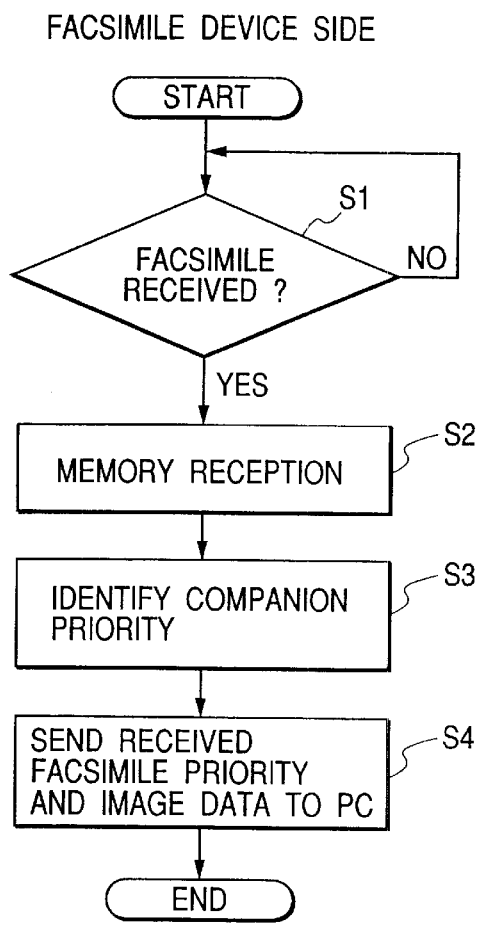
FIG. 6A is a flowchart to show the flow of operation of the facsimile device in the first embodiment of the present invention.
Figure 6B:
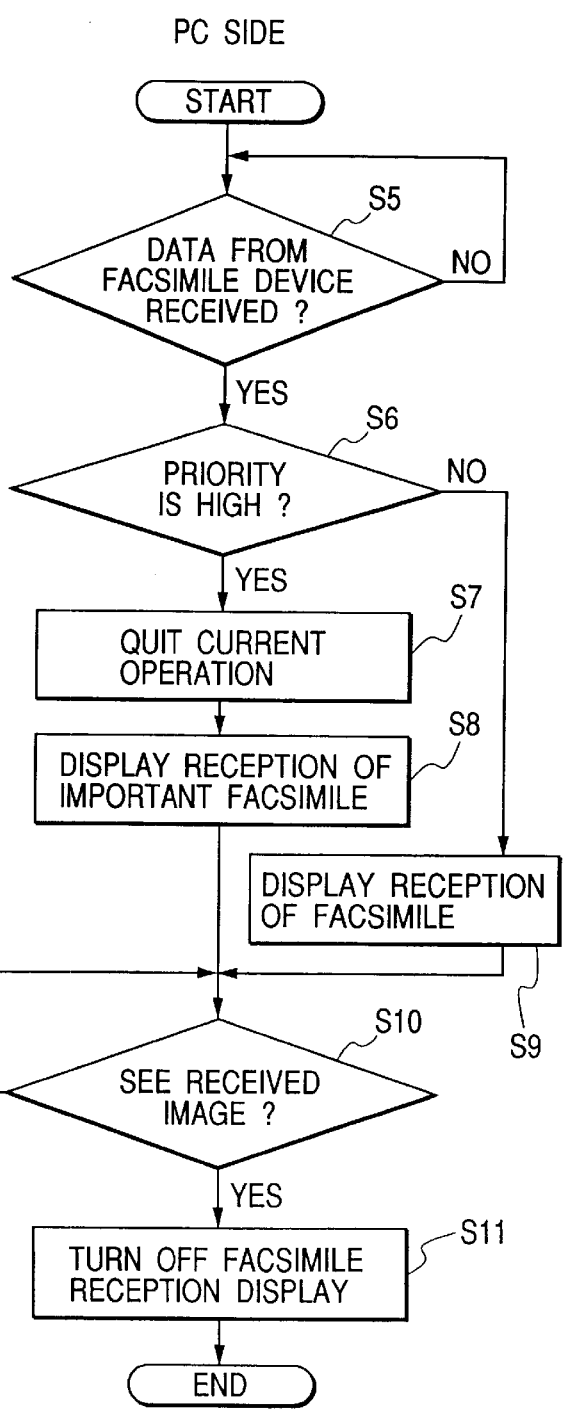
FIG. 6B is a flowchart to show the flow of operation of PC 12 in the first embodiment of the present invention.

FIGS. 6A and 6B are flowcharts to show the operation at power on of the PC 12 in the first embodiment; FIG. 6A shows the operation on the facsimile device side while FIG. 6B shows the operation on the PC 12 side.

When the facsimile device receives a facsimile message via the public network (S1), the facsimile device performs memory reception, i.e., stores the received image data in the DRAM 4 (S2). Then the device identifies the priority of the sender from the companion data (S3) and sets the value of priority ID. Then the facsimile device transmits this priority ID and the received image data to the PC 12 (S4).

Next, the PC 12 receives the priority ID and received image data from the facsimile device (S5) and then checks the priority (S6). When the priority is high (priority ID=0), the PC 12 suspends the current operation under execution except for the facsimile receiving process on the PC 12 (S7), displays a message "An urgent (important) facsimile is received." in the display device, and indicates a mark representing the reception of facsimile with high priority at the right bottom corner (S8). It is a matter of course that a prescribed voice output may be given with the display.

Figure 7:
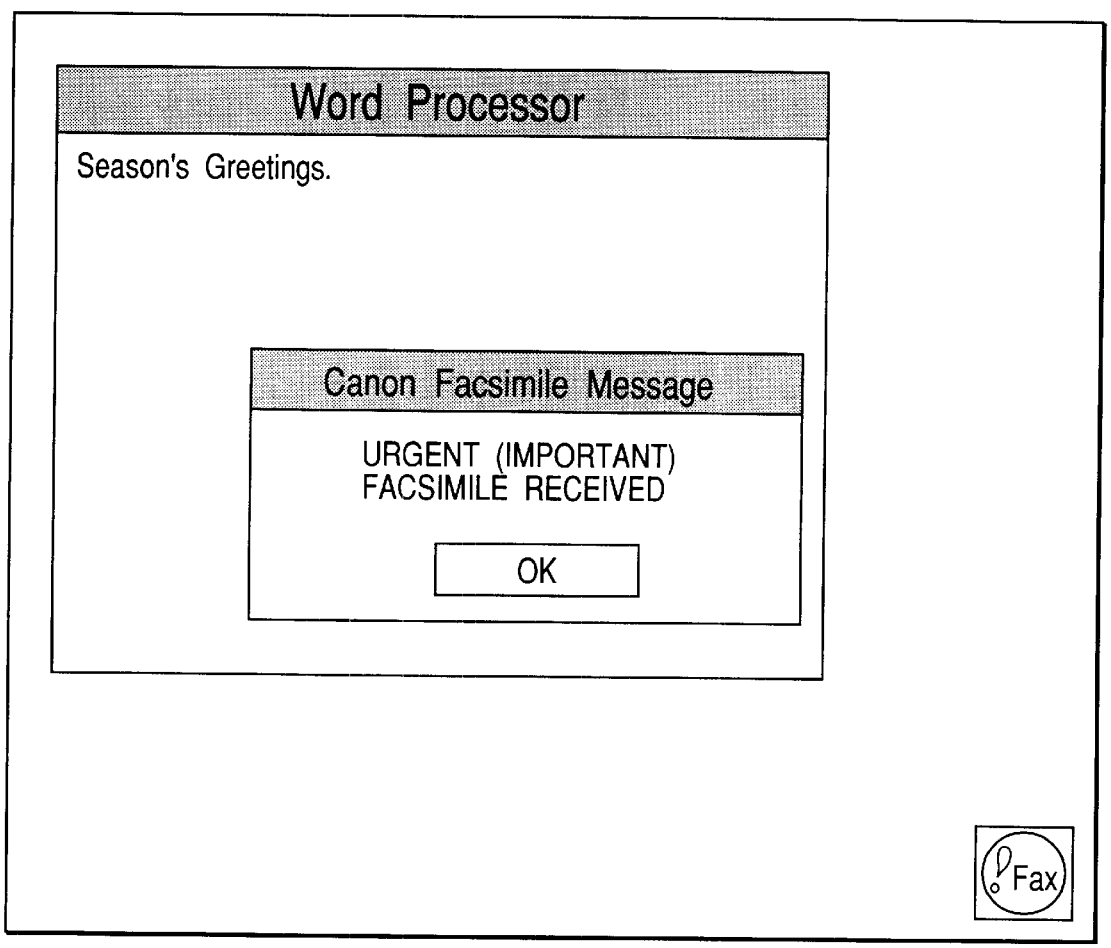
FIG. 7 is a diagram to show an example of a display screen of the PC on the occasion of reception of an urgent facsimile.

FIG. 7 is an explanatory diagram to show an example of the display screen in the display device of the PC 12 in this case.

As illustrated, the message of "An urgent (important) facsimile is received." is displayed by a pop-up window in the center of the screen under preparation of a document or the like. In this window there is an "OK" button for permitting the operator to give an instruction of carrying out the display of the facsimile data received. A receive mark to indicate the reception of urgent (important) data is displayed at the right bottom corner of the display screen.

When the operator depresses the "OK" button through the keyboard, a pointing device, or the like, the substance of the facsimile image received is displayed. In this case, the operator is not allowed to return to the other work unless the received image is displayed. After the substance of the facsimile image is displayed (S10), the receive mark at the right bottom corner is erased (S11) and the operator is allowed to return to the other work.

When the priority of the received image data transmitted from the facsimile device is low on the other hand (priority ID≠0), a facsimile receive mark corresponding to the priority is displayed in the order of reception from the left at the right bottom corner (S9). It is also a matter of course that a prescribed voice output may be given with this display.

Figure 8:
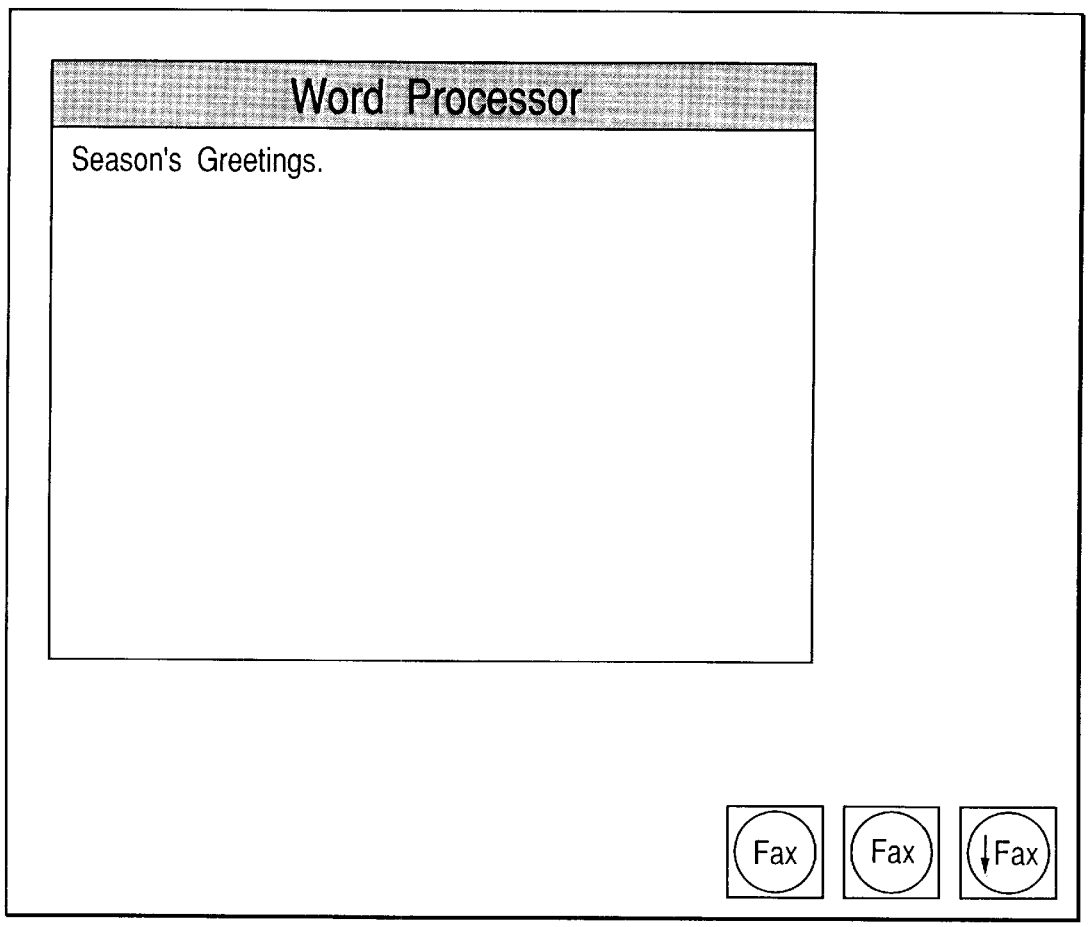
FIG. 8 is a diagram to show an example of a display screen of the PC on the occasion of reception of a non-urgent facsimile.

FIG. 8 is an explanatory diagram to show a display screen in the PC 12 in this case.

In the example illustrated, a receive mark to indicate normal priority is displayed for the priority ID=1 and a receive mark to indicate low priority for the priority ID=2, and they are displayed in the order of reception from the left.

The received image can be displayed by clicking one of these facsimile receive marks using the pointing device or the like. The other work can be carried on in the state of the screen shown in FIG. 8, without displaying the received images. After a received image is displayed (S10), a corresponding facsimile receive mark is erased from the screen (S11).

Figure 9:
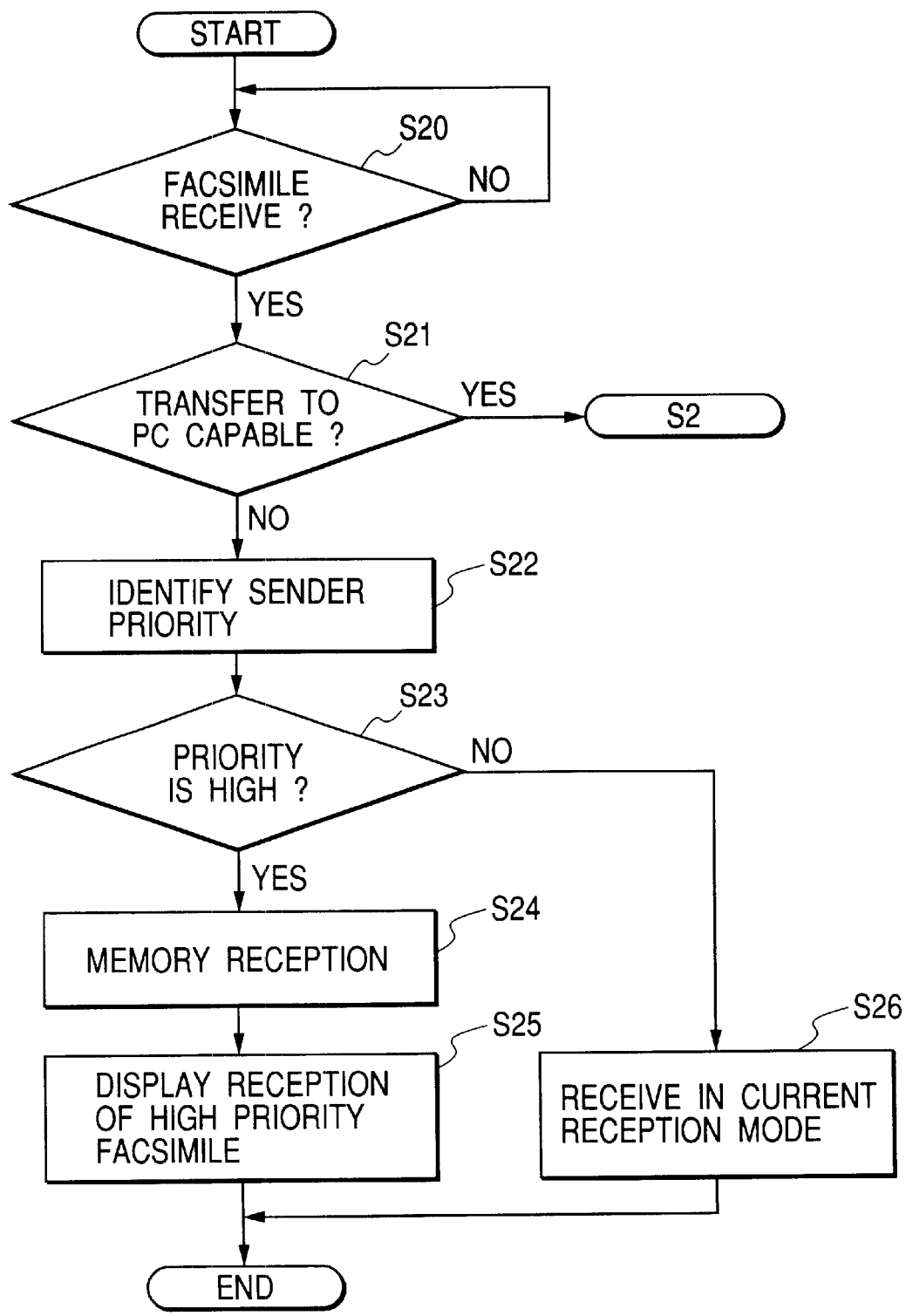
FIG. 9 is a flowchart to show the flow of operation of the facsimile device in the first embodiment with also giving consideration to the case where it cannot transfer data to the PC.

FIG. 9 is a flowchart to show the operation of the facsimile device also taking account of the case where the PC 12 is in the power off state in this first embodiment.

In this case, with reception of a facsimile via the public network (S20), the facsimile device determines whether the PC 12 is ready for reception of the received data (S21). When the PC 12 is ready, the facsimile device moves to S2 of FIG. 6A to perform the same processing as described above. When the data cannot be transferred to the PC 12 because of power off of the PC 12 or from other reasons, the facsimile device identifies the priority of the sender (S22). When the priority is high (priority ID=0), the facsimile device goes into the memory reception (S23, S24) and notifies the user of the reception by giving an indication of different lighting timing of the reception lamp 13 from that in the normal reception, in order to permit the user to identify the reception of the facsimile with high priority (S25).

When the priority is not high (priority ID≠0), the facsimile device performs the facsimile receiving process in a receive mode currently set in the facsimile device (for example, printing-out by the printer 6 or the memory reception into the DRAM 4) (S23, S26).

Figures 10, 11:
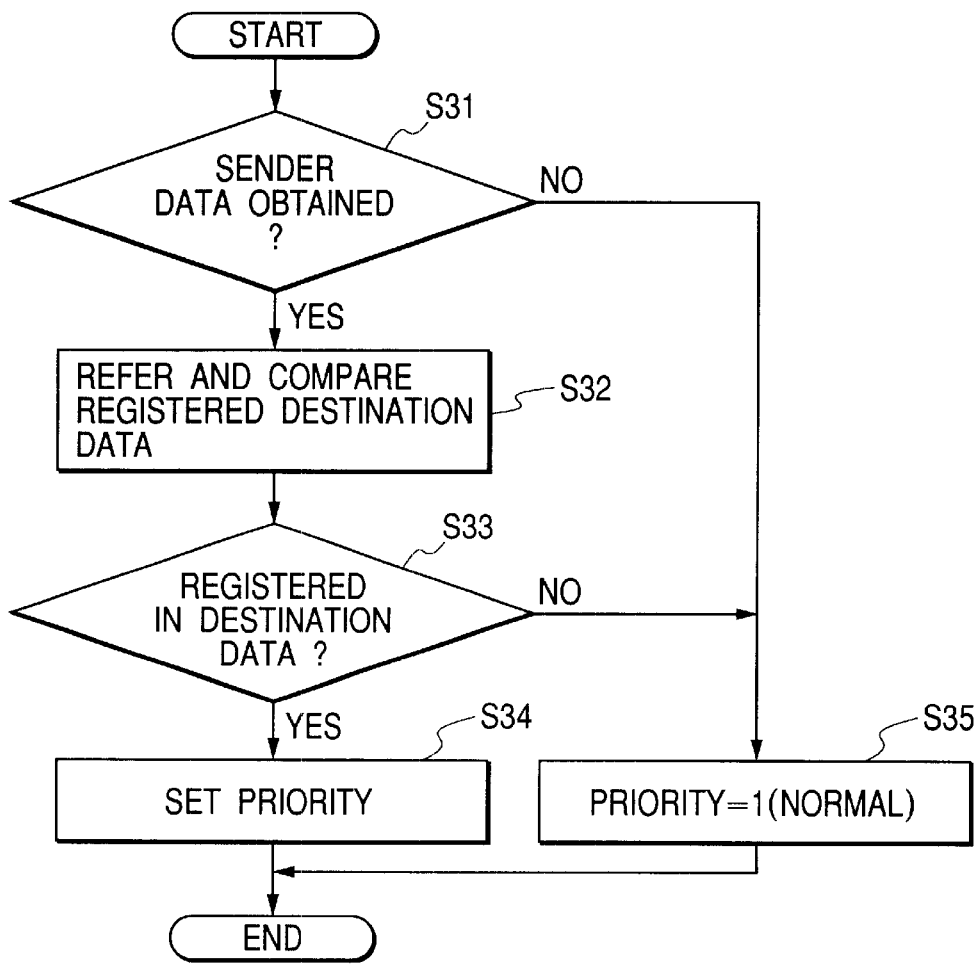
FIG. 10 is a flowchart to show the flow of processing on the occasion of analyzing companion data.
FIG. 11 is a diagram to show a specific example of priority IDs for determining priority in the second embodiment of the present invention.

FIG. 10 is a flowchart to show the flow of processing for analyzing the companion data.

First, the facsimile device acquires the companion data from the sender facsimile device via the public network (S31). The companion data acquired herein may be the both or either one of the companion abbreviation (which is one included in the NSS signal based on ITU-T Recommendation T.30 in the case of G3 facsimile communication) and the companion facsimile number (which is one included in the TSI signal based on ITU-T Recommendation T.30 in the same case). If the device fails to acquire it, the device sets the normal priority (priority ID=1) as the companion data to be transferred to the PC 12, and terminates the processing (S35).

When the companion data is acquired, the device refers to the registered companion data and compares the acquired companion data therewith (S32). If companion data corresponding to the acquired companion data is not registered (S33), the facsimile device sets the normal priority (priority ID=1) as the companion data and terminates the processing (S35).

If the companion data corresponding to the acquired companion data is registered, the facsimile device sets the value of priority ID as the companion data to be transferred to the PC 12 and terminates the processing (S34).

As described above, in the power on state of the PC connected to the facsimile device, the work currently under execution is suspended only when an urgent or important facsimile is received, which can encourage the user to instantly display the received facsimile. In the power off state of the PC connected, the memory reception is carried out and the user can be notified of the reception of the urgent or important facsimile by the different lighting pattern of the reception lamp.

The second embodiment of the present invention will be described below. The first embodiment described above was so adapted as to determine the priority according to the companion, whereas the second embodiment is so adapted that when the sender sends image data with a priority ID set for each transmission data, the facsimile device performs a reception notification process, based on this priority ID. The structure illustrated in FIG. 1 is also applicable to the present embodiment and the description thereof is omitted herein.

FIG. 11 is an explanatory diagram to show a specific example of the priority data used in the second embodiment.

The second embodiment uses the priority IDs of three-digit numerals and the priority values of one-digit numerals of 0, 1, and 2.

On the occasion of transmission of image data from the sender, the user sets a code corresponding to the priority ID by a predetermined key operation procedure, together with input of a destination. The sender facsimile device sets this set priority ID, for example, in a sub-address and transmits the image data.

When receiving the data, the receiver facsimile device detects the data of the sub-address and collates it with the priority IDs of the priority data stored in its own SRAM 3. After determining the priority ID, the receiver facsimile device sets the value as the companion data to be transferred to the PC 12 (see FIG. 4) and transfers it to the PC 12 to effect notification of reception.

The present embodiment is so arranged that the priority data is stored on the SRAM 3 of the facsimile device, but the system may be so adapted that the priority data is set on the PC 12 and that the sub-address data is set and transferred thereto as the companion data from the facsimile device.

Figure 12A:
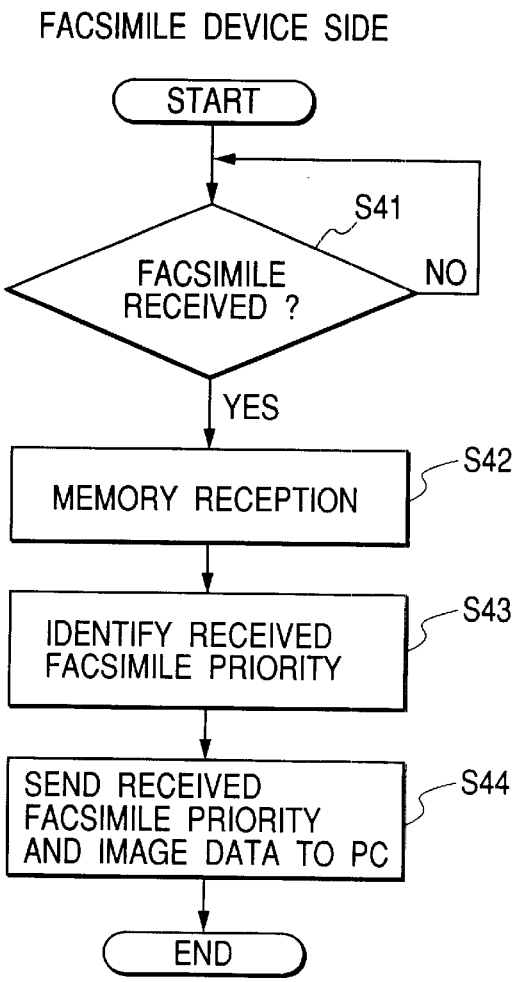
FIG. 12A is a flowchart to show the flow of operation of the facsimile device in the second embodiment of the present invention.
Figure 12B:
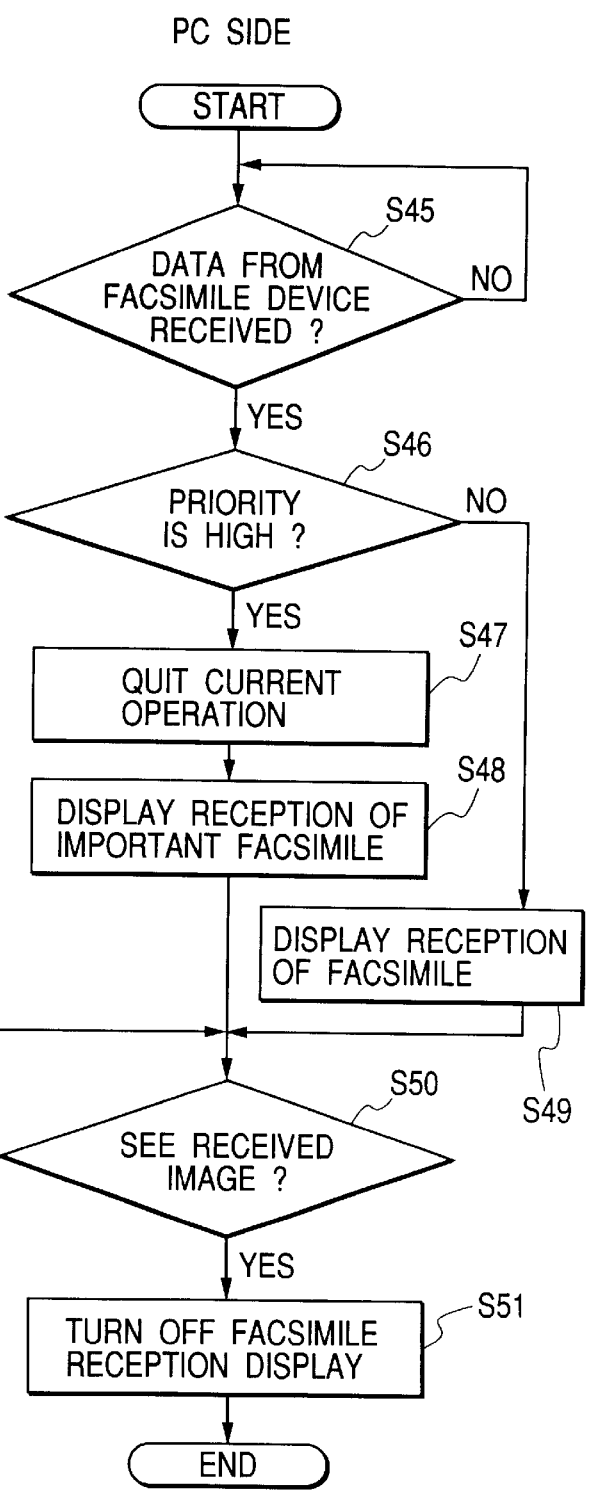
FIG. 12B is a flowchart to show the flow of operation of PC 12 in the second embodiment of the present invention.

FIGS. 12A and 12B are flowcharts to show the operation at power on of the PC 12 in the second embodiment; FIG. 12A shows the operation on the facsimile device side while FIG. 12B shows the operation on the PC side.

When the facsimile device receives a facsimile message via the public network (S41), it performs the memory reception of image data (S42). Then the facsimile device identifies the priority of the received image data from the data set in the sub-address (S43), sets the value of priority ID, and transfers it and the received image data to the PC 12 (S44).

Without data set in the sub-address or without data corresponding to the priority ID, the priority is set as "normal" and the received image data is transferred therewith to the PC 12 (S44).

Receiving the priority and received image data from the facsimile device (S45), the PC 12 then suspends the work currently under execution on the PC 12 if the priority is high (priority ID=0) (S47). Then the PC displays the message of "An urgent (important) facsimile is received." as illustrated in FIG. 7 and displays a mark to indicate the reception of the facsimile with high priority at the right bottom corner (S48). It is also matter of course that a prescribed voice output may be given with this display.

When the "OK" button is depressed on the display of FIG. 7, the substance of the facsimile image received is displayed. In this case, the operator is not allowed to return to the other work unless the substance of the received image is displayed. After the substance of the received facsimile image is displayed (S50), the receive mark at the right bottom corner is erased (S51) and then the operator is allowed to return to the other work.

When the priority of the received image data from the facsimile device is low on the other hand (priority ID≠0), a facsimile receive mark corresponding to the priority is displayed in the order of reception from the left at the right bottom corner, as illustrated in FIG. 8 (S49). It is also a matter of course that a prescribed voice output may be given with this display.

Figure 13:
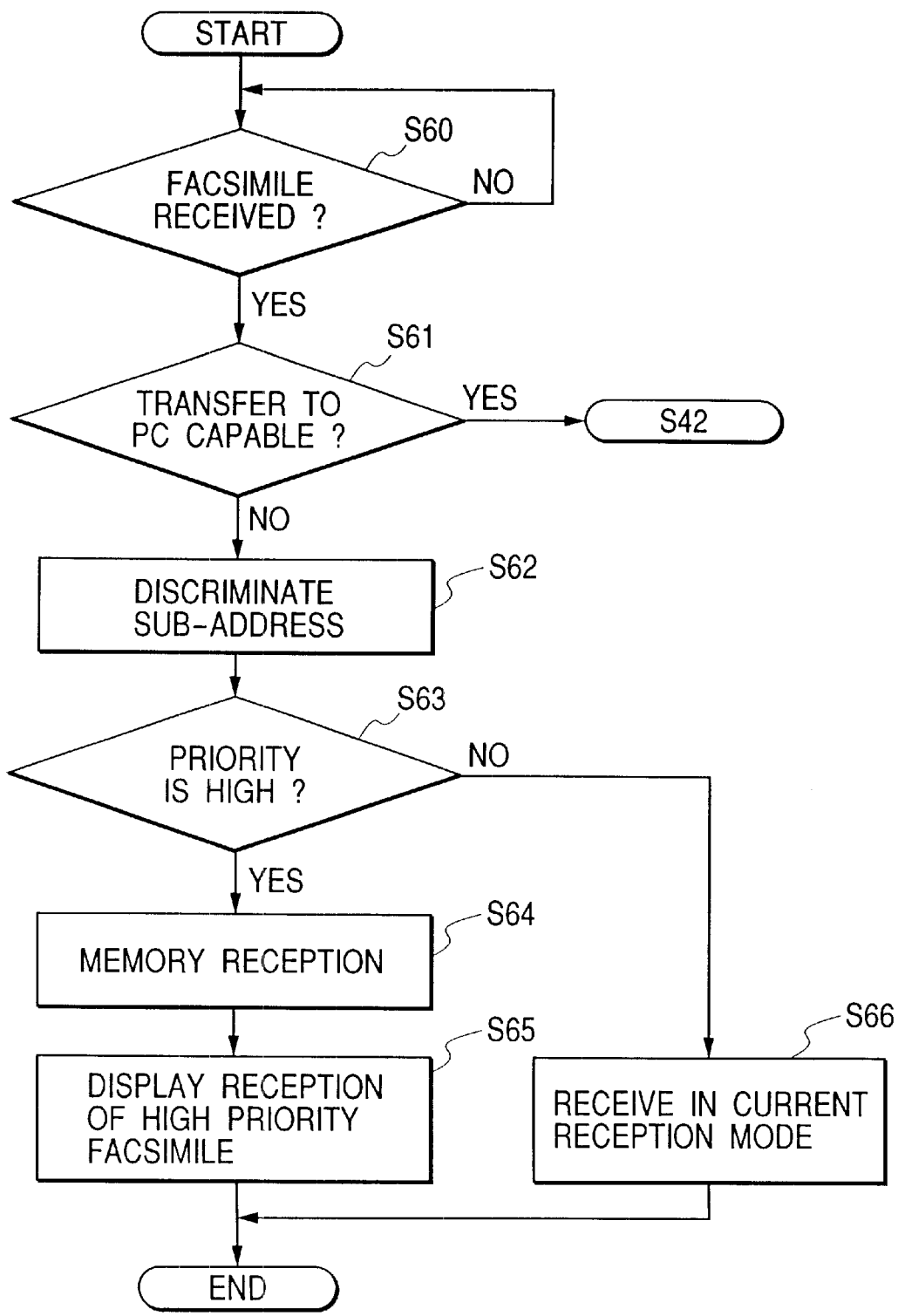
FIG. 13 is a flowchart to show the flow of operation of the facsimile device in the second embodiment with also giving consideration to the case where it cannot transfer data to the PC.

FIG. 13 is a flowchart to show the operation of the facsimile device also taking account of the power off case of the PC 12 in the second embodiment.

In this case, when the facsimile device receives a facsimile via the public network (S60), it determines whether the received data can be transferred to the PC 12 (S61). When the data can be transferred, the facsimile device moves to S42 of FIG. 12A to carry out the same processing as before. When the data cannot be transferred because of the power off of the PC 12 or from other reasons (S61), the facsimile device checks the sub-address sent from the sender and identifies the priority, based on this sub-address, as described above (S62). When the priority is high (priority ID=0), the facsimile device performs the memory reception (S63, S64), and notifies the user of the reception of the facsimile with high priority by giving the indication of different lighting timing of the reception lamp 13, in order to permit the user to identify the reception of the facsimile with high priority (S65).

When no data is set in the sub-address, when the data corresponding to the priority ID is not found, or when the priority is not high (priority ID≠0), the facsimile device receives the facsimile in the receive mode currently set in the facsimile device (S63, S66).

Figure 14:
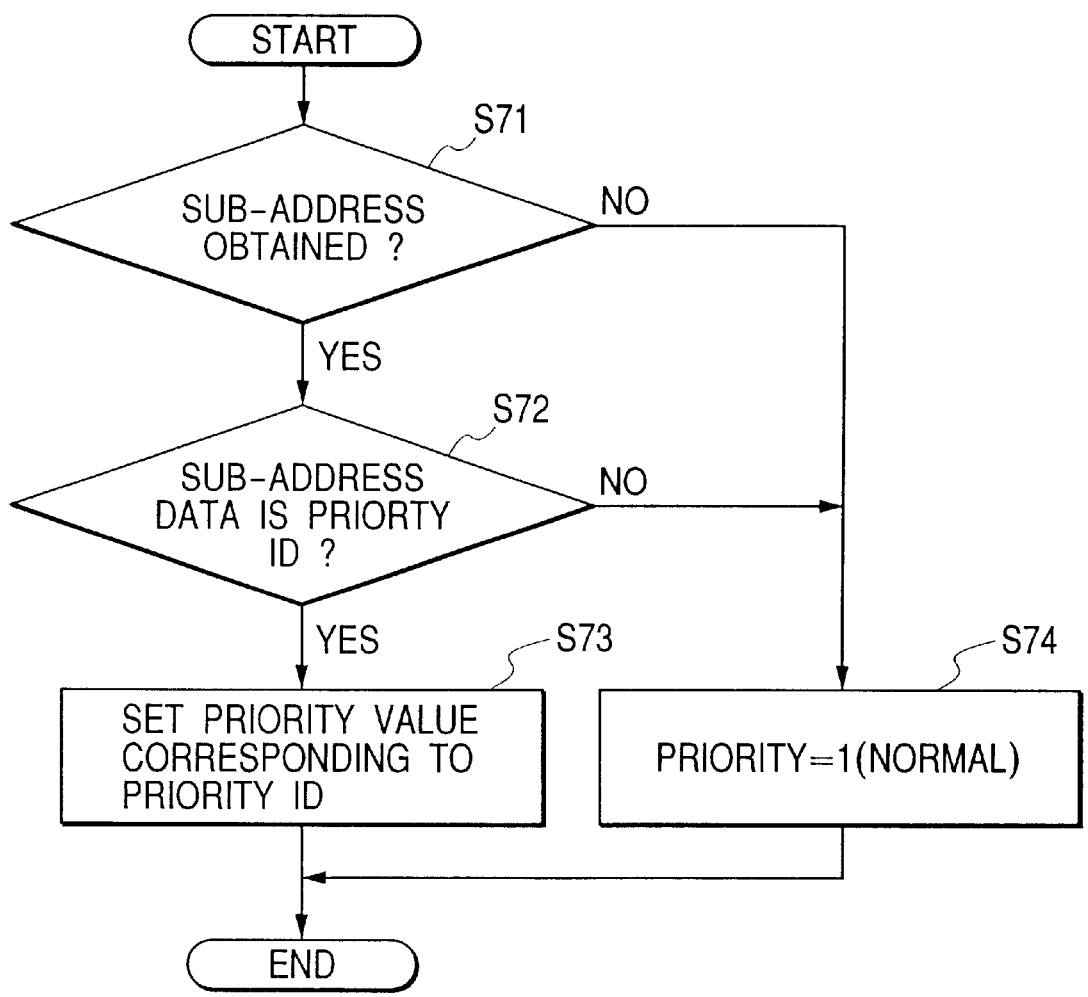
FIG. 14 is a flowchart to show the flow of processing for identifying a sub-address in the second embodiment.

FIG. 14 is a flowchart to show the flow of processing for identifying the priority.

First, the facsimile device acquires the sub-address sent from the sender via the public network (S71). If it is not acquired, the priority "normal" (priority ID=1) is set as the companion data to be transferred to the PC 12 and the processing is then terminated (S74).

Once the sub-address from the sender is acquired, it is compared with the priority IDs registered for setting of priority on the SRAM 3 (S72). When data corresponding to either priority ID is not set in the sub-address, the priority "normal" (priority ID=1) is set as the companion data to be transferred to the PC 12 and the processing is then terminated (S74).

When data corresponding to either priority ID is set in the sub-address, the value of the priority ID is set as the companion data to be transferred to the PC 12 and the processing is then terminated (S73).

As described above, in the power on state of the PC connected to the facsimile device, the work currently under execution is suspended only when an urgent or important facsimile is received, which can encourage the user to instantly display the facsimile received. Particularly, the priority can be set by the sender's will for every transmission data, which permits more appropriate operation of reception notification.

In the power off state of the PC connected, the facsimile device carries out the memory reception and notifies the user of the reception of the urgent or important facsimile by the different lighting pattern of the reception lamp.

The above example was so adapted that on the occasion of sending the priority of the received facsimile to the PC, the image data of the received facsimile was also sent to the PC at the same time, but, instead thereof, the system may also be so arranged that the image data is not sent to the PC on the occasion of sending the priority to the PC but the received image data is sent to the PC according to an instruction given thereafter from the PC.

For example, in a system in which the facsimile device and PC share a large-capacity external memory and in which the received image data is stored in this external memory, a configuration well suited for practical circumstances of the system can be established in such a manner that at the time of notification of the priority the received image data is kept in the external memory and only its management information is transferred to the PC and that thereafter the received image data is invoked from the external memory to the PC as occasion may demand.

The above example was adapted to perform the notification of the priority using the sub-address, but, without having to be limited to this, the priority may be notified of using an area in that the user can arbitrarily set data in another procedure signal.

The above example was so adapted that with reception of important image data the work was forced to be suspended and that the received image was displayed, but the system does not always have to be constructed in this way. The system may be so constructed that the operator can determine whether or not the received image with high priority should be displayed.

The third embodiment of the present invention will be described. The embodiments described above were the examples in which the message to indicate the reception of urgent facsimile was displayed on the display screen of the PC 12. The third embodiment is so adapted that with reception of an urgent facsimile the PC displays a name of a sender and a demagnified image of the first page (a thumb-nail). The structure illustrated in FIG. 1 is also applicable to the present embodiment and the description thereof is omitted herein.

Figure 15:
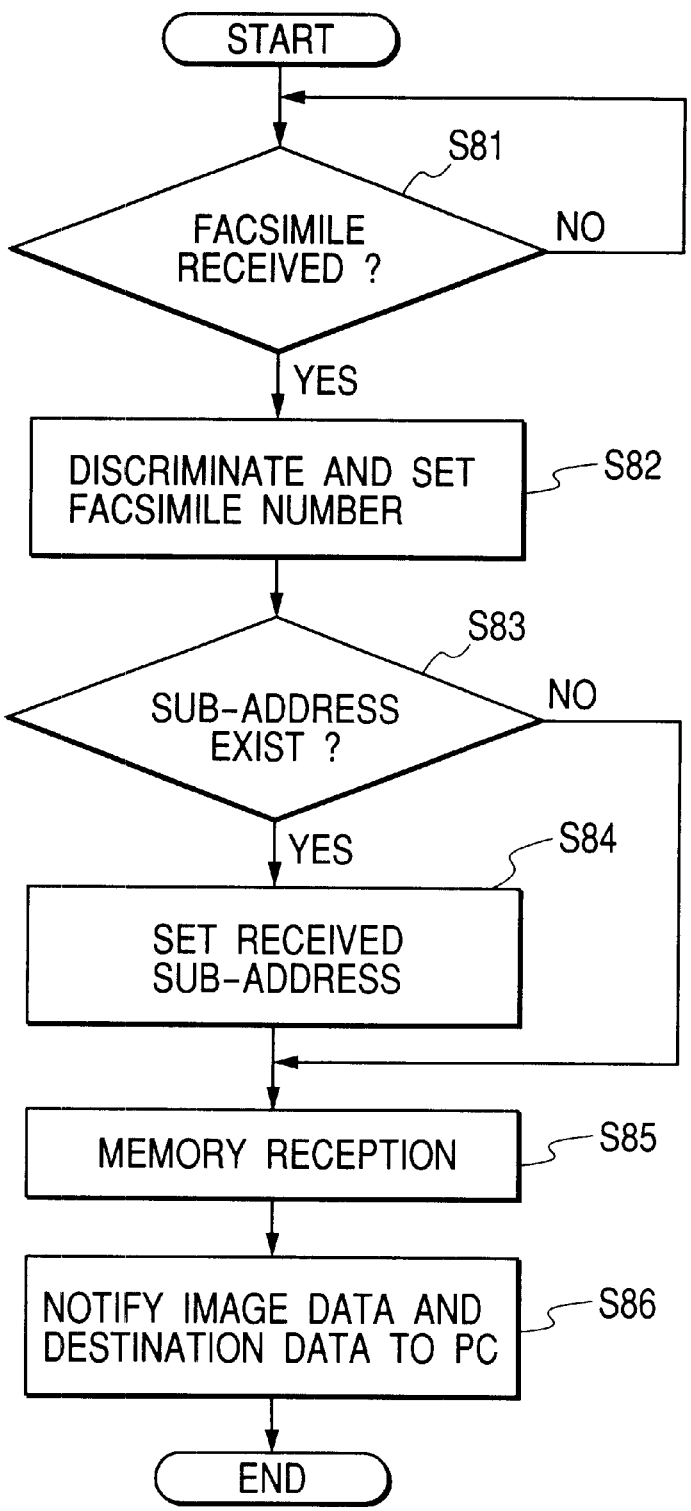
FIG. 15 is a flowchart to show the flow of operation of the facsimile device in the third embodiment of the present invention.
Figure 16:
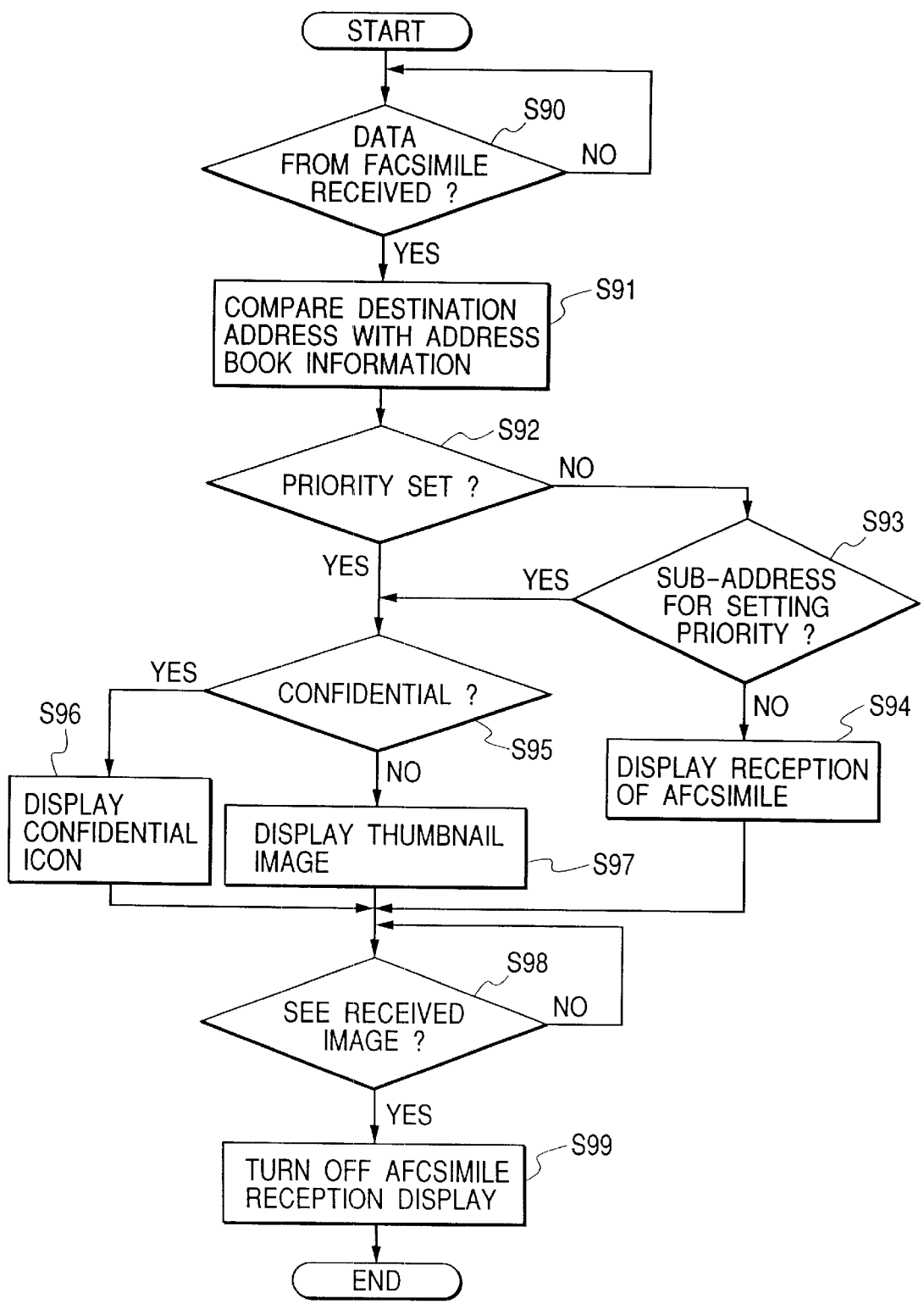
FIG. 16 is a flowchart to show the flow of operation of the PC 12 in the third embodiment of the present invention.

FIG. 15 is a flowchart to show the flow of the operation of the facsimile device and FIG. 16 is a flowchart to show the flow of the operation of the PC in the third embodiment.

When the facsimile device receives a facsimile message via the public network (S81), the facsimile device identifies the facsimile number of the sender and stores it on the SRAM 3, thereby setting it as the companion data to be transferred to the PC 12 (S82). There are no specific restrictions on the facsimile number identified herein and, for example, it can be either of the TSI signal specified in ITU-T Recommendation T.30 in the case of G3 facsimile communication, an originator number notified of upon calling via the network, and so on.

It is then determined whether the sub-address is designated by the sender (S83). If designated, the information of the sub-address received is stored on the SRAM 3 and is set as the companion data (S84).

The image data from the sender is stored on the DRAM 4 (S85). The companion data stored on the SRAM 3 is stored as associated with the image data stored on the DRAM 4, and vice versa.

Then the facsimile device sends the companion data stored on the SRAM 3 and the image data stored on the DRAM 4 through the PC I/F 11 to the PC 12 (S86).

Receiving the companion data and the received image data from the facsimile device, the PC 12 once stores them on the hard disk or the like (S90).

Then the PC 12 successively compares the companion data received with those in the address book provided in the PC 12 to check whether the facsimile number corresponding to the companion data received is registered or not (S91).

When the address book includes the facsimile number corresponding to the companion data received, the PC determines whether the priority is set for the facsimile number (S92). When the priority is not set, the PC determines whether the companion data received includes the sub-address and whether the sub-address is registered as one for setting of priority (or for urgent reception) (S93). If there are no conditions for setting of priority, a mark to indicate the reception of facsimile is displayed at the right bottom corner of the display screen of the display device, as illustrated in FIG. 8 (S94).

When the facsimile received is one from a companion with priority or one from a companion who sent the image data while designating the sub-address for the priority to be set, it is determined whether the image data received is confidential data (S95).

Figure 17:
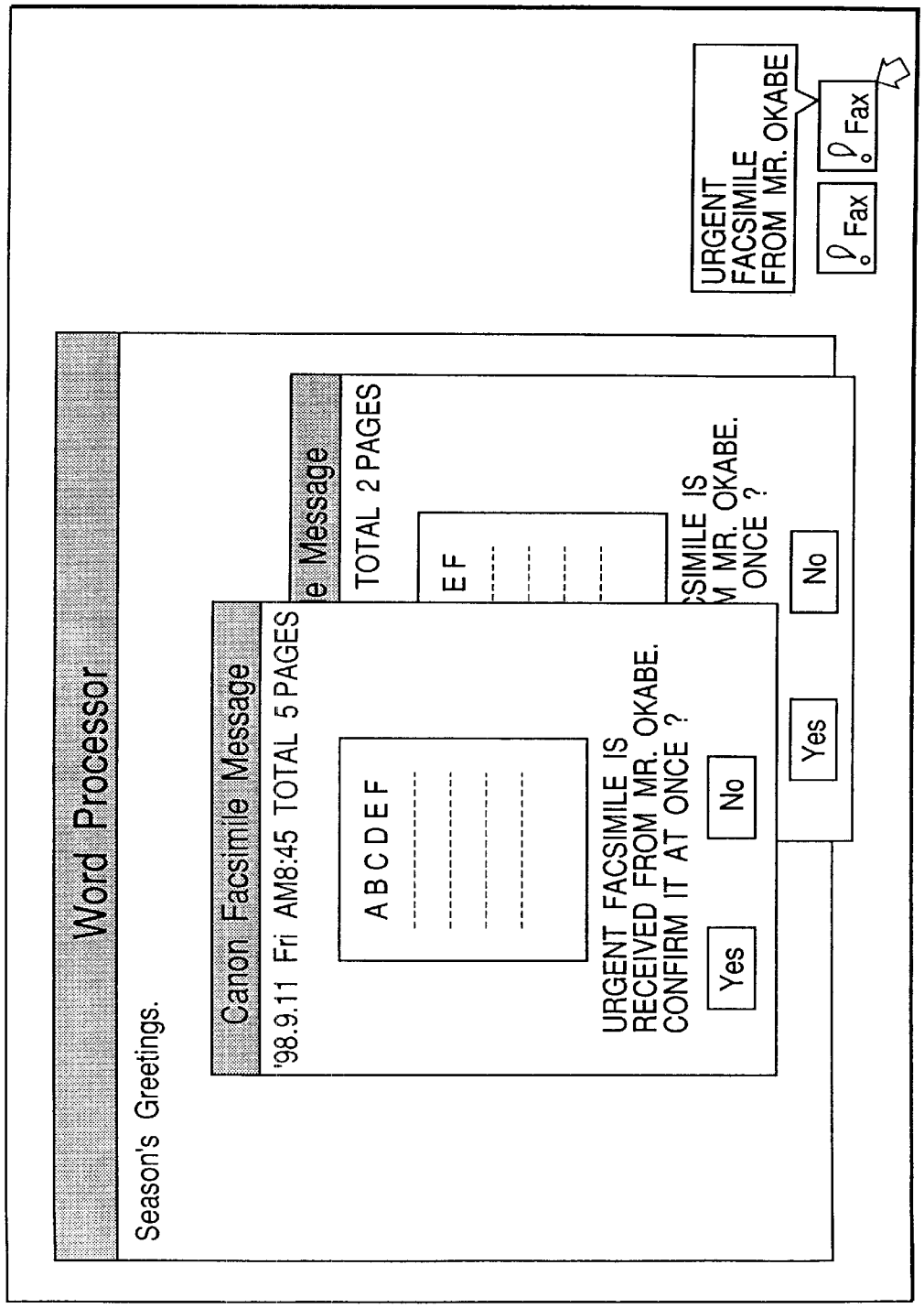
FIG. 17 is a diagram to show an example of a display screen of the PC on the occasion of reception of an urgent facsimile in the third embodiment.

If it is not confidential data, the PC displays a thumb-nail image (demagnified image) of the first page of the image data received as illustrated in FIG. 17 (S97). On this occasion of display, the PC also displays the date of reception, the time, the total page number, the name of the sender (the name registered in the address book or the name information sent from the sender, the facsimile number, etc.), in addition to the thumb-nail image. Further, the PC makes an inquiry of "Do you want to check the message now?" When the "Yes" button is depressed, the image data received is displayed in the enlarged form and all the pages are successively displayed.

At the same time as this thumb-nail display, the PC also displays the mark to indicate the reception of the urgent facsimile in the order of reception from the left at the right bottom corner of the display screen of the display device. When the pointer of the pointing device is placed on this mark, the name of the sender is displayed. When the mark is clicked, the received image can also be displayed in the same manner as in the previous case of depression on the "Yes" button.

Figure 18:
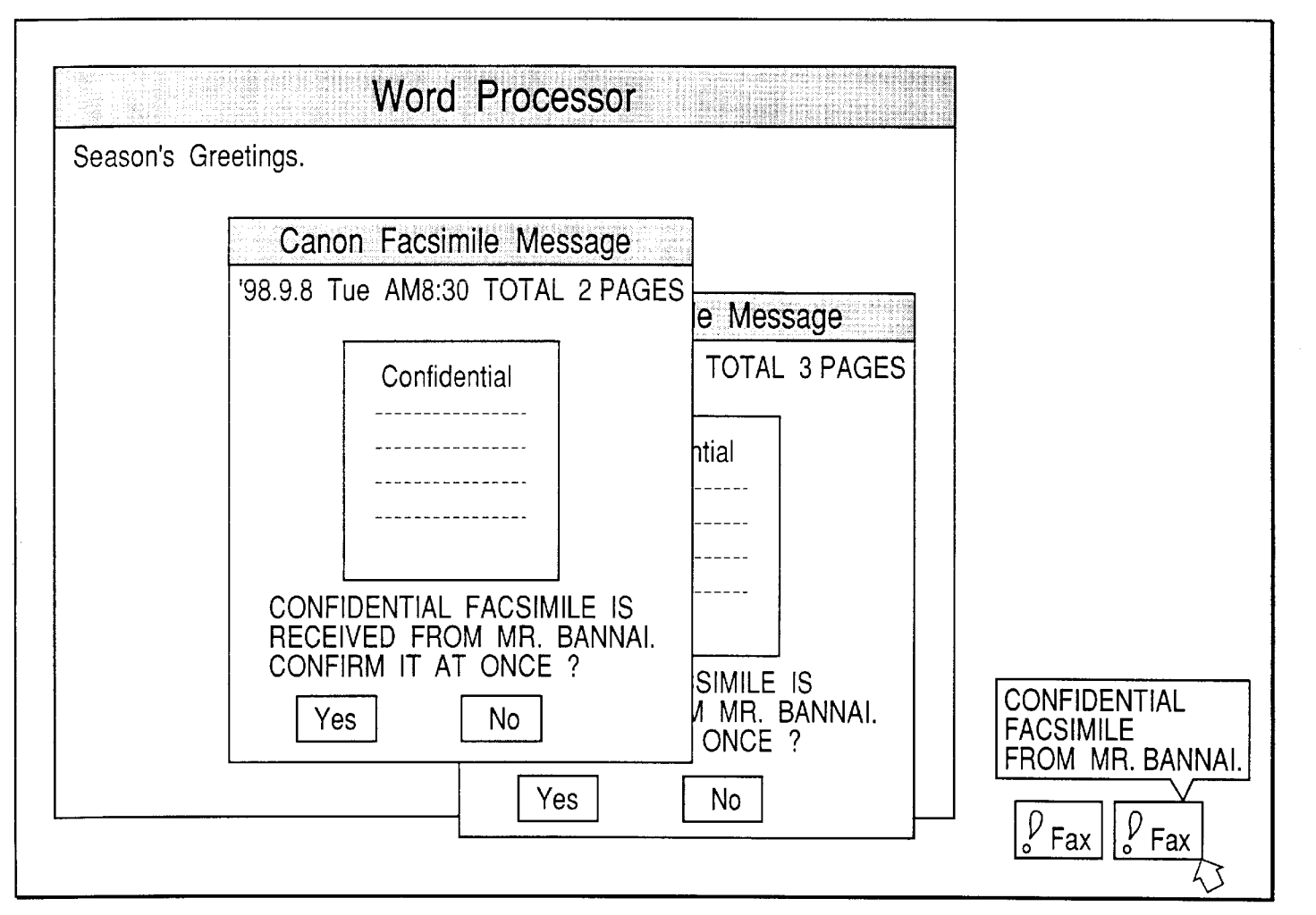

When the image data received is confidential data on the other hand, an icon to indicate the confidential data is displayed instead of the thumb-nail display, as illustrated in FIG. 18 (S96). In this case, depression on the "Yes" button results in displaying a screen for input of a password, and the received image will be displayed only if a correct password is input. When the pointer is placed on the mark at the right bottom corner of the display screen, the name of the sender and a message saying "confidential" are displayed.

After the received image is displayed and checked (S98), the mark is erased from the right bottom corner of the display screen (S99).

As described above, the third embodiment makes it easier to determine an image to be displayed immediately by selection of the operator on the receiver side, out of urgent facsimiles received.

In the present embodiment, the address book used for setting of priority is stored on the hard disk of the PC 12 and is used for giving a transmission instruction through the PC I/F 11 to the facsimile device. The priorities set in this address book can also be used on the occasion of the transmission instruction. It can also be contemplated that, for sending a message to a companion with a priority set, control is performed so as to send the message to the companion with the priority before those without the priority set or so as to shorten redial time intervals in the event of redial.

Contrary, the priority can be set low. It can be contemplated that, for sending a message to a companion with a low priority, it is sent in the time zone of low communication rate or that, in the case of reception, a mark to indicate the low priority is displayed.

The flowcharts of FIGS. 6A, 6B, 9, 10, 12A, 12B to 16 and the display screens of FIGS. 7, 8, 17, and 18 are executed or displayed each under control of the CPU 1 based on the program stored on the ROM 2 of the facsimile device or under control of the MPU of the PC 12 based on the application program installed on the hard disk of the PC 12. It is also possible to store this program in the memory such as the floppy disk and to make another device perform the same processing.

The above examples were described as to the case of image communication through the facsimile devices, but the present invention can also be applied similarly to systems having a communication terminal device for performing other data communication and the PC connected thereto.

The embodiments described above are so adapted that the different ways of notification of reception to the external information processing device are used between on the occasion of reception of an emergent document or an important document and on the occasion of reception of other documents in the communication terminal device, whereby whether the work in the information processing device should be suspended or continued can be determined depending upon the emergency or importance of the received document, thus achieving the effect of providing the convenient system.

The present invention also encompasses such application that program code of software for implementing the function of the aforementioned embodiments is supplied to a computer in an apparatus or a system connected to various devices so as to operate the various devices in order to implement the function of the aforementioned embodiments and that the various devices are operated according to the program stored in the computer (CPU or MPU) of the system or apparatus.

In this case, the program code of software itself implements the function of the aforementioned embodiments, so that the present invention comprises the program code itself and means for supplying the program code to the computer, for example, a storage medium that stores such program code.

The storage medium for storing such program code can be selected, for example, from a floppy disk, a hard disk, an optical disk, a magnetooptical disk, a CD-ROM, a magnetic tape, a nonvolatile memory card, an ROM, and so on.

It is needless to mention that the present invention involves not only the embodiment wherein the computer executes the program code supplied to implement the function of the aforementioned embodiments, but also an embodiment of the program code wherein the function of the aforementioned embodiments is implemented by program code working with the OS (operating system) or another application soft or the like working on the computer.

It is also needless to mention that the present invention involves an embodiment wherein the program code supplied is once stored in a memory provided in a function expansion board of the computer or in a function expansion unit connected to the computer and wherein thereafter a CPU or the like provided in the function expansion board or in the function expansion unit carries out part or the whole of the actual processing, based on instructions of the program code, whereby the processing implements the function of the aforementioned embodiments.

The present invention was described based on the preferred embodiments, but it should be noted that the present invention can encompass a variety of modifications in the scope as claimed, without having to be limited to the embodiments.

What is claimed is:

1. A data communication device comprising:

a connector, which connects with an external terminal;

a receiver, which receives data from a communication partner;

a register, which registers at least one sender which should have high priority;

an identifier, which identifies whether the data received by said receiver has high priority, based on whether the sender of the data received by said receiver is registered by said register when said receiver receives the data;

a selector, which selects a proper form of information for specifying that the data received by said receiver has high priority, in a case where said identifier identifies that the data received by said receiver has high priority; and a notifier, which notifies the external terminal through said connector of the information for specifying that the data received by said receiver has high priority, in the form selected by said selector.

2. The data communication device according to claim 1, further comprising:

a determiner, which determines whether said notifier can notify the external terminal connected through said connector of the information; and a display unit, which shows a display according to a result of said identifier, when said determiner determines that said notifier cannot notify the external terminal of the information.

3. A control method for controlling an information processing terminal connected to a data communication device for performing data communication, said control method comprising:

a reception step, of receiving data received by the data communication device and information concerning a sender of the received data, from the data communication device;

a determination step, of determining a priority of the received data, based on address information included in the information concerning the sender, received in said reception step; and a control step, of performing control so as to vary a form of notification of reception, indicating that the information processing terminal has received the data, according to a determination result in said determination step.

4. The control method according to claim 3, wherein said control step is so adapted that, when the data communication device receives data with a high priority, a display device displays a message indicating reception of the data.

5. The control method according to claim 3, wherein said control step is so adapted that, when the data communication device receives data with a high priority, a display device displays a demagnified image of the data received in said reception step.

6. The control method according to claim 3, wherein said control step is so adapted that, when the data communication device receives data with a high priority, a display device displays information indicating a sender of the received data.

7. The control method according to claim 3, wherein said control step is so adapted that, when the data communication device receives confidential data, a display device displays information indicating reception of the confidential data.

8. A computer readable program, stored in a storage medium, for implementing a method of controlling an information processing terminal connected to a data communication device for performing data communication, said program comprising:

code for a reception step, of receiving data received by the data communication device and information concerning a sender of the received data, from the data communication device;

code for a determination step, of determining a priority of the received data, based on address information included in the information concerning the sender, received in the reception step; and code for a control step, of performing control so as to vary a form of notification of reception, indicating that the information processing terminal has received the data, according to a determination result in the determination step.

9. A method of operating a data communication device, comprising the steps of:

connecting with an external terminal;

receiving data from a communication partner;

registering at least one sender which should have high priority;

identifying whether the received data has high priority, based on whether the sender of the data received in said receiving step has been registered in said registering step when the data is received;

selecting a proper form of information for specifying that the received data has high priority, in a case where the received data is identified as having high priority; and notifying the external terminal connected with the data communication device of the information for specifying that the received data has high priority, in the form selected in said selecting step.

10. A computer readable program, stored in a storage medium, for implementing a method of operating a data communication device connected with an external terminal, said program comprising:

code for a reception step, of receiving data from a communication partner;

code for a registering step, of registering at least one sender which should have high priority;

code for an identification step, of identifying whether the received data has high priority, based on whether the sender of the data received in said receiving step has registered in said registering step when the data is received;

code for a selection step, of selecting a proper form of information for specifying that the received data has high priority, in a case where the received data is identified as having high priority; and code for a notification step, of notifying the external terminal connected with the data communication device of the information for specifying that the received data has high priority, in the form selected in the selection step.

* * * * *